United States Patent
Brunsman et al.

(10) Patent No.: US 9,182,975 B2
(45) Date of Patent: *Nov. 10, 2015

(54) AUTOMATIC APPLICATION UPDATES

(71) Applicant: Google Inc., Mountain View, CA (US)

(72) Inventors: Jonathan Brunsman, Mountain View, CA (US); Ilya Firman, San Mateo, CA (US); Ficus Kirkpatrick, Los Altos Hills, CA (US); Jasper Lin, Monterey Park, CA (US); Aurash Mahbod, San Jose, CA (US); Linda K. Nguyen, Sunnyvale, CA (US); Michael Siliski, San Francisco, CA (US); Christian Sonntag, San Francisco, CA (US); Andrew Devron Stadler, San Francisco, CA (US); Christoph Studer, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/665,417

(22) Filed: Mar. 23, 2015

(65) Prior Publication Data

US 2015/0193225 A1 Jul. 9, 2015

Related U.S. Application Data

(63) Continuation of application No. 14/280,753, filed on May 19, 2014, now Pat. No. 8,990,795, which is a continuation of application No. 13/526,839, filed on Jun. 19, 2012, now Pat. No. 8,769,526.

(51) Int. Cl.
*G06F 9/44* (2006.01)
*G06F 9/445* (2006.01)

(52) U.S. Cl.
CPC ... *G06F 8/65* (2013.01); *G06F 8/61* (2013.01)

(58) Field of Classification Search
None
See application file for complete search history.

(56) References Cited

U.S. PATENT DOCUMENTS 7,447,799 B2 11/2008 Kushner
7,853,253 B2 12/2010 Gharabally et al.
(Continued)

FOREIGN PATENT DOCUMENTS

WO   03091896 A1   11/2003

OTHER PUBLICATIONS

"BYOD Requires Mobile Device Management", Copyright 2011, LexisNexis, May 6, 2011.

(Continued)

Primary Examiner — Philip Wang
(74) Attorney, Agent, or Firm — Morris & Kamlay LLP

(57) ABSTRACT

A method for updating an application on a mobile device includes accessing, at the mobile device, application management information. The application management information identifies a plurality of applications installed on the mobile device and one or more granted permission settings associated with each installed application. The method also includes sending, from the mobile device to a server, a request for update information regarding each installed application and receiving, at the mobile device from the server, the update information. The update information identifies an update package for a respective application of the plurality of installed applications. The method also includes installing the update package without user interaction from a user of the mobile device if one or more required permission settings associated with the update package are included in the one or more granted permission settings associated with the respective application of the plurality of installed applications.

13 Claims, 4 Drawing Sheets

(56) References Cited

U.S. PATENT DOCUMENTS

| | | | |
|---|---|---|---|
| 2004/0215755 A1* | 10/2004 | O'Neill | 709/223 |
| 2008/0301669 A1* | 12/2008 | Rao et al. | 717/173 |
| 2008/0301672 A1* | 12/2008 | Rao et al. | 717/177 |
| 2010/0011052 A1 | 1/2010 | Gharabally et al. | |
| 2011/0289499 A1* | 11/2011 | Haubold et al. | 717/173 |
| 2013/0104114 A1* | 4/2013 | Reiss et al. | 717/170 |

OTHER PUBLICATIONS

Alonso, "Automatic updates on Ubuntu with unattended-upgrades", Apr. 11, 2011; XP882712991; Retrieved from the Internet: URL:http://redes-privadas-virtuales.blogspot.de/2811/84/automatic-updates-on-ubuntuwith.html.

European Patent Office, Extended Search Report for EP 13 171 890.0, Oct. 10, 2013.

* cited by examiner

AUTOMATIC APPLICATION UPDATES

CROSS REFERENCE TO RELATED APPLICATIONS

This application is a continuation of, and claims priority to, U.S. patent application Ser. No. 14/280,753, filed on May 19, 2014, which is a continuation of, and claims priority to, U.S. patent application Ser. No. 13/526,839, filed on Jun. 19, 2012.

BACKGROUND

Handheld computing devices such as the mobile telephone have proliferated in recent years. These devices can be equipped with processors, memory, and the capability to communicate through local and wide area networks, including the Internet. These devices can be equipped with operating systems which permit the devices to execute a wide range of computer programs and software applications, typically called "apps." The user of a handheld computing device, or mobile device, can download and install applications or other content by direct communication with a server through a mobile telephone network or wireless local area network. Alternatively, a user can attempt to download applications to a personal computer such as a desktop or a laptop computer. Once the applications are downloaded to the personal computer, the applications can be further transmitted to the mobile device through a process such as synchronization, which can involve tethering the mobile device to the personal computer. Obtaining updates for the applications installed on the mobile device can require tethering the mobile device to the personal computer or other types of user interaction to obtain updates for the installed applications.

SUMMARY

The disclosure relates to updating an application automatically.

In one implementation, a method for updating an application on a mobile device is disclosed. The method includes accessing, at the mobile device, application management information. The application management information identifies a plurality of applications installed on the mobile device and one or more of a connection preference and a size limitation associated with each installed application. The method also includes sending, from the mobile device to a server, a request for update information regarding each installed application and receiving, at the mobile device from the server, the update information. The update information identifies an update package for a respective application of the plurality of installed applications. The method also includes receiving the update package without user interaction from a user of the mobile device when all of the at least one of a connection preference and a size limitation are satisfied, wherein a size limitation is satisfied when the update package has a size less than the size limitation associated with the respective application and the connection preference is satisfied when the mobile device uses a network connection specified by the connection preference associated with the respective application.

In another implementation, a mobile device is disclosed. The mobile device includes a display, an input device, one or more processors for controlling the operations of the mobile device, and a memory for storing data and program instructions used by the one or more processors. The one or more processors are configured to execute instructions stored in the memory to access application management information, wherein the application management information identifies a plurality of applications installed on the mobile device and one or more of a connection preference and a size limitation associated with each installed application. The one or more processors are further configured to send a request to a server for update information regarding each installed application and receive the update information from the server. The update information identifies an update package for a respective application of the plurality of installed applications. The one or more processors are further configured to receive the update package without user interaction from a user of the mobile device when all of the at least one of a connection preference and a size limitation are satisfied, wherein a size limitation is satisfied when the update package has a size less than the size limitation associated with the respective application and the connection preference is satisfied when the mobile device uses a network connection specified by the connection preference associated with the respective application.

In another implementation, a non-transitory computer readable medium is disclosed including program instructions executable by one or more processors. The instructions, when executed, cause the one or more processors to perform operations that include accessing, at a mobile device, application management information. The application management information identifies a plurality of applications installed on the mobile device and one or more of a connection preference and a size limitation associated with each installed application. The operations also include sending, from the mobile device to a server, a request for update information regarding each installed application. The operations also include receiving, at the mobile device from the server, the update information. The update information identifies an update package for a respective application of the plurality of installed applications. The operations also include sending, from the mobile device to the server, a request for transmission of the update package and receiving, at the mobile device from the server, the update package. The operations also include receiving the update package without user interaction from a user of the mobile device when all of the at least one of a connection preference and a size limitation are satisfied, wherein a size limitation is satisfied when the update package has a size less than the size limitation associated with the respective application and the connection preference is satisfied when the mobile device uses a network connection specified by the connection preference associated with the respective application.

BRIEF DESCRIPTION OF THE DRAWINGS

The description here makes reference to the accompanying drawings wherein like reference numerals refer to like parts throughout the several views, and where.

DETAILED DESCRIPTION

In the automatic application updating system and methods described here, a mobile device can receive updates for installed applications without user interaction, for example, without tethering the mobile device to a personal computer or manually downloading and installing updates using an interface that is displayed by the mobile device. Based on identifying the plurality of applications installed on the mobile device and granted permission settings associated with each installed application, the mobile device can send a request for update information regarding each installed application to a server. In response to the request, the mobile device can receive update information which identifies an update package for a respective application if an update is available. The mobile device can then install the update package without user interaction so long as the required permission settings associated with the update package are included in the granted permission settings associated with the respective application. The system and methods described here can allow the mobile device to install updates for multiple installed applications without user interaction with the mobile device.

Figure 1:
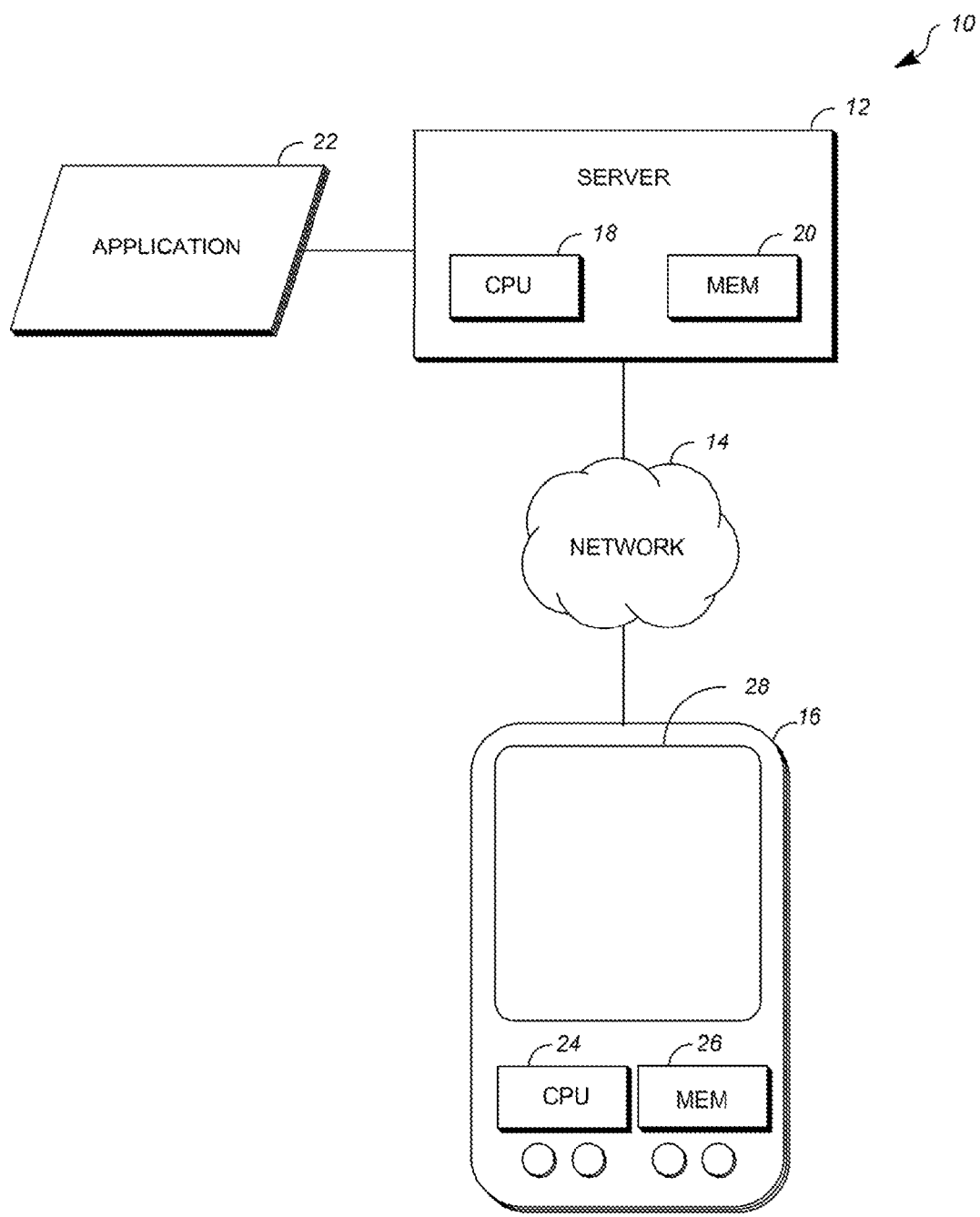
FIG. 1 is a block diagram of a system for updating applications automatically.

FIG. 1 is a block diagram of a system 10 in accordance with one implementation. The system 10 can include a server 12, a network 14, and a mobile device 16.

The server 12 can include a processor such as central processing unit (CPU) 18 and a memory 20. In some embodiments, the server 12 can include two or more processors. Further, the server 12 can be implemented on two or more computing devices. In yet other embodiments, the server 12 can be implemented as a distributed system, using multiple computers and/or computing devices. In yet other embodiments, the server 12 can be built on a virtual machine, which itself can run on one or more computers and/or computing devices. The memory 20 can store data and program instructions that are used by the CPU 18. The server 12 can, for example, receive an update manager application 22 from an application developer and transmit various types of information about the update manager application 22 to the mobile device 16 over the network 14.

The network 14 can put the server 12 in communication with the mobile device 16 for transmitting information between the server 12 and the mobile device 16.

The mobile device 16 can include a processor such as CPU 24 and a memory 26. The memory 26 can store data and program instructions that are used by the CPU 24. The mobile device 16 can also include or be in communication with one or more output devices, such as display 28. The display 28 can enable a device user of the mobile device 16 to interact with the update manager application 22 transferred to the mobile device 16 from the server 12. An example of the mobile device 16 is further described in FIG. 2.

Figure 2:
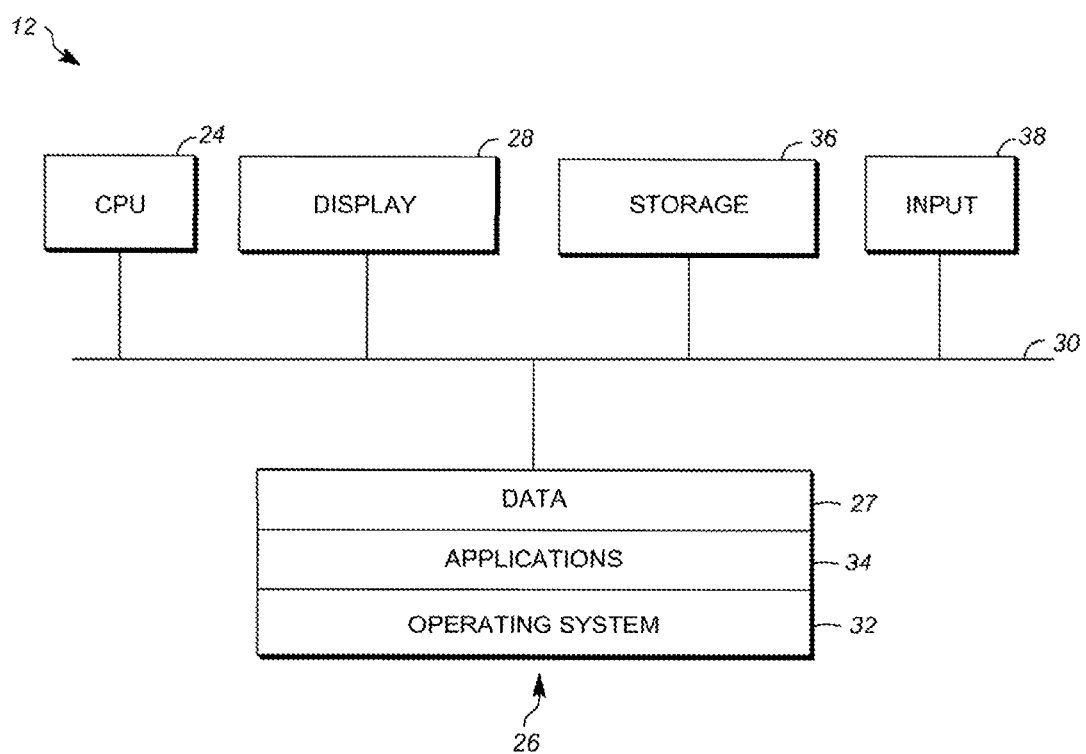
FIG. 2 is a block diagram showing an example of a mobile device.

FIG. 2 is a block diagram of the mobile device 16 of FIG. 1. The mobile device 16 can be any type of handheld device in the form of a single computing device, for example, a smartphone, a laptop computer, a notebook computer, a mobile telephone, a tablet, a PDA, and the like.

The CPU 24 in the mobile device 16 can be a conventional central processing unit. Alternatively, the CPU 24 can be any other type of device, or multiple devices, capable of manipulating or processing information now-existing or hereafter developed. Although the disclosed embodiments can be practiced with a single processor as shown, e.g. CPU 24, advantages in speed and efficiency can be achieved using more than one processor.

The memory 26 in the mobile device 16 can be a random access memory device (RAM). Any other suitable type of storage device can be used as the memory 26. The memory 26 can include code and data 27 that is accessed by the CPU 24 using a bus 30. The memory 26 can also include an operating system 32 and installed applications 34, the installed applications 34 including programs that permit the CPU 24 to perform the methods described here. For example, the installed applications 34 can include the update manager application 22 described in FIG. 1. The mobile device can also include additional storage 36, which can, for example, be a memory card, external memory, a flash drive, or any other form of suitable computer readable medium. Because the installed applications 34, including the update manager application 22, can contain a significant amount of information, they can be stored in whole or in part in the secondary storage 36 and loaded into the memory 26 as needed for processing.

The mobile device 16 can include one or more output devices, such as display 28. The display 28 can be a liquid crystal display (LCD), a cathode-ray tube (CRT), or any other type of display that allows output to be presented to a user, for example, in response to receiving a video signal. The mobile device 16 can include an input 38, such as a keyboard, a mouse, a touch sensitive device, or a gesture sensitive input device that can receive user inputs and can output signals or data indicative of the user inputs to the CPU 24.

Although FIGS. 1 and 2 depict the CPUs 18, 24 and the memories 20, 26 of the server 12 and the mobile device 16 as being integrated into single units, other configurations can be utilized. The operations of the CPUs 18, 24 can be distributed across multiple machines (each machine having one or more of processors) which can be coupled directly or across a local area or other network. The memories 20, 26 can be distributed across multiple machines such as network-based memory or memory in multiple machines performing the operations of the server 12 and mobile device 16. Although depicted here as a single bus, the bus 30 of the mobile device 16 can be composed of multiple buses. Further, the secondary storage 36 can be directly coupled to the other components of the mobile device 16 or can be accessed via a network and can comprise a single integrated unit such as a memory card or multiple units such as multiple memory cards. The server 12 and the mobile device 16 can thus be implemented in a wide variety of configurations.

Figure 3:
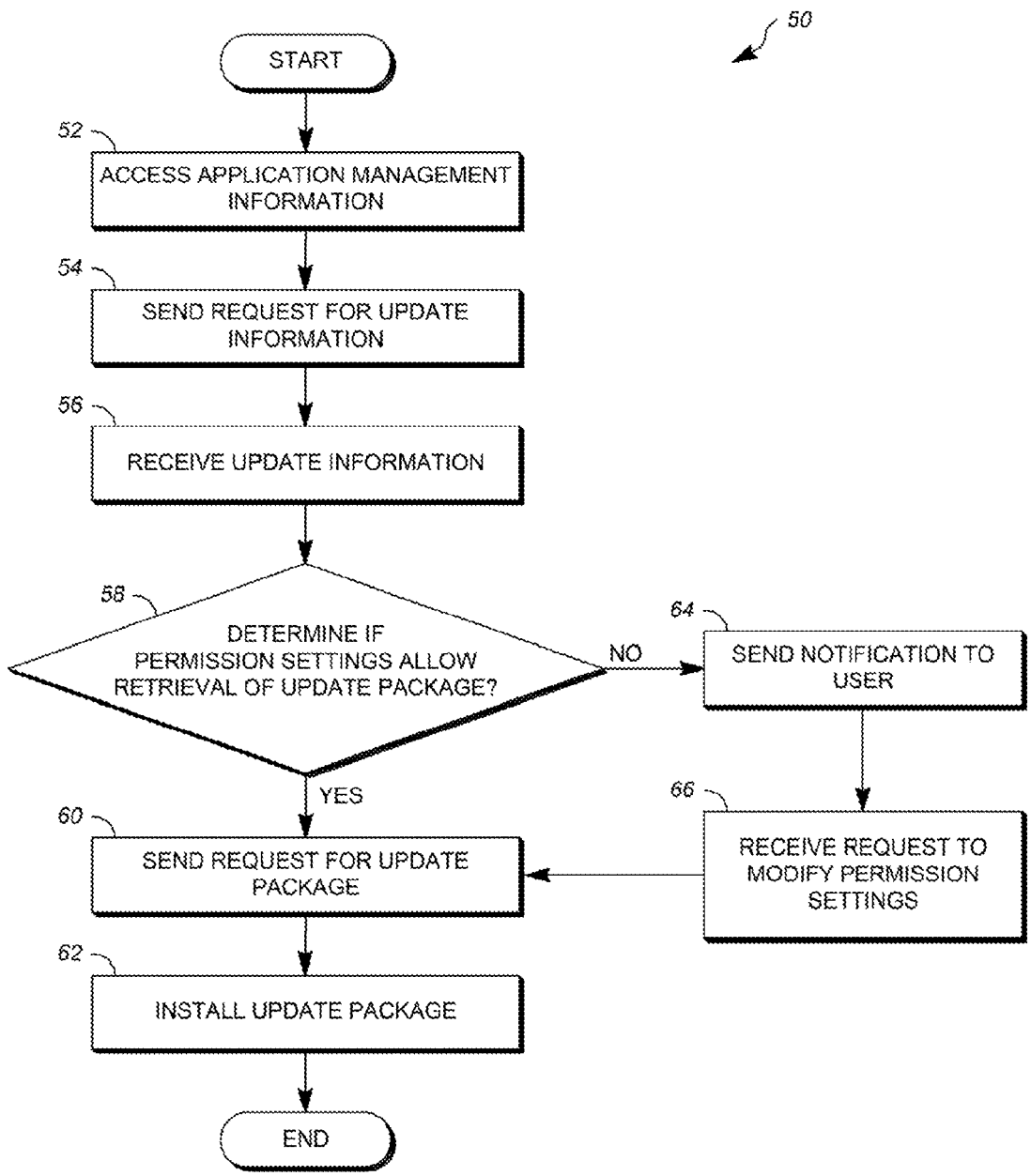
FIG. 3 is a flow chart showing an example process for updating applications automatically.
Figure 4:
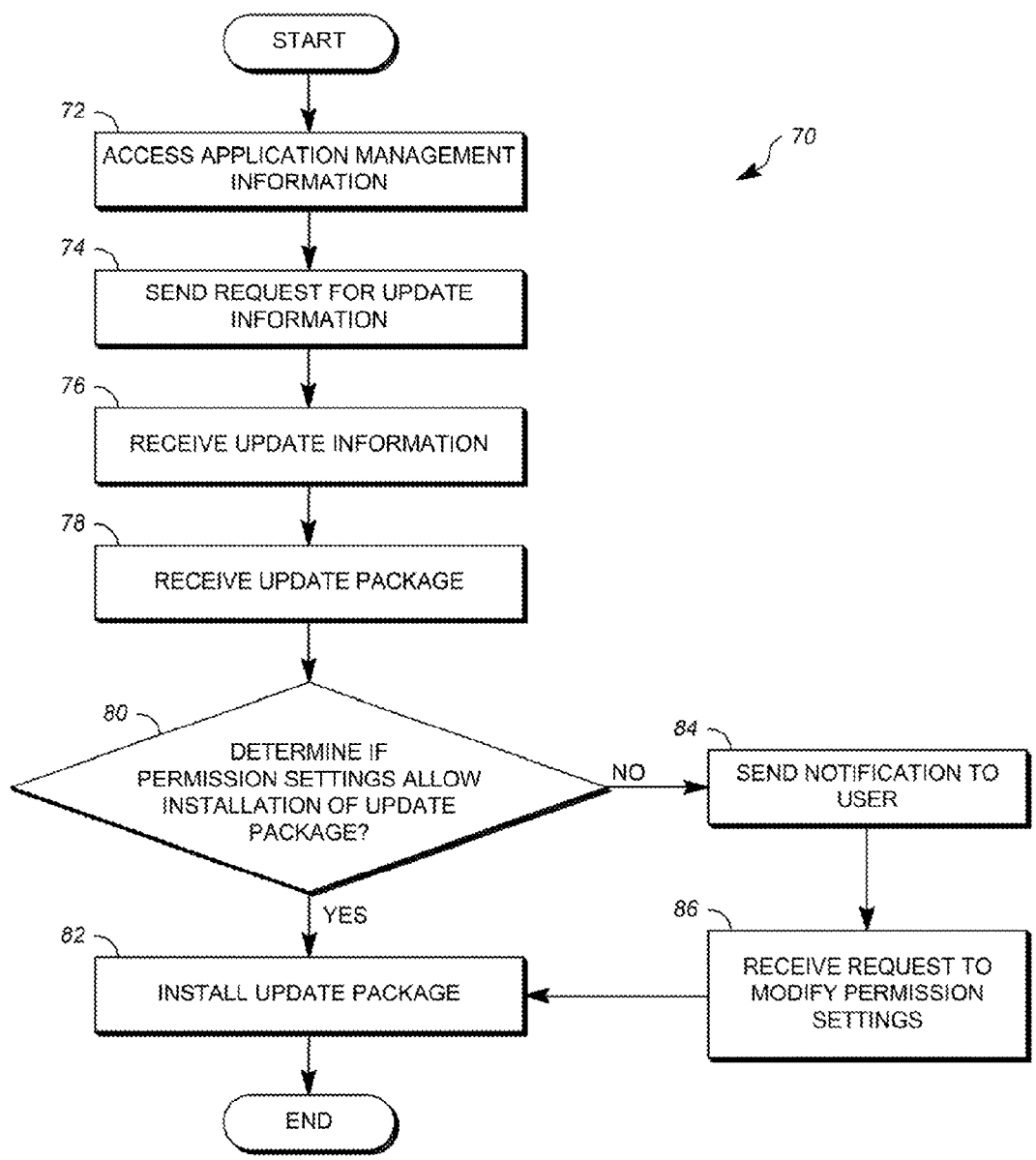
FIG. 4 is a flow chart showing another example process for updating applications automatically.

FIGS. 3 and 4 are flow charts showing example processes for updating an application installed on a computing device automatically. Process 50 in FIG. 3 includes a computing device such as mobile device 16 in communication with the system 10 as shown in FIG. 1.

In stage 52, application management information can be accessed at the mobile device using the update manager application 22. The application management information can include information identifying the mobile device 16 and configuration information pertaining to the mobile device 16. The application management information can also identify a plurality of applications installed on the mobile device. The application management information can include, for example, a listing of applications installed on the mobile device 16. The information identifying the installed applications can include information such as a name or other text-based identifier and version information for the installed application.

The application management information can also identify one or more granted permission settings associated with each installed application. The permission settings for each installed application can control how each application interacts with other parts of the mobile device 16, with the network 14 and server 12, and with other devices. Permission settings can include connection settings, interaction settings, and device user data settings. Connection settings can control how the mobile device 16 communicates with other devices using, for example, USB, Bluetooth, WIFI, or other communication methods. Interaction settings can control whether an application can access other applications and basic functions of the mobile device 16, for example, simulate pressing a key, change the time it takes to lock the display screen, or the like. Device user data settings can control whether a given application has permission to access device user specific information including, for example, email, text messages, contacts, calendars, GPS location, and the like.

The connection settings can also include the option of the device user setting a preference to automatically update installed applications. For example, the device user can set a preference to automatically update installed applications only in the presence of a WIFI connection. The preference to automatically update installed applications can be set for all installed applications on the device or on an application-by-application basis. Additionally, the connection settings can include application update size limitations. For example, application updates over a certain size can be restricted to automatically updating in the presence of a WIFI connection.

After accessing the application management information, the mobile device 16 can send a request for update information regarding each installed application to the server 12 at stage 54 to determine whether an update package is available for one or more of the installed applications. The request for update information can include the application management information identifying the mobile device 16, identifying the applications installed on the mobile device 16, and identifying the granted permission settings associated with each installed application. The request for update information can be sent without device user interaction with the mobile device 16. For example, the mobile device 16 can be configured to automatically initiate a network communication requesting the update information from the server 12. The network communication can be automatic in the sense that a device user need not send a request for the network communication to be initiated. As used herein, network communication can mean a message, signal, or data that is transmitted from a client device, such as the mobile device 16, and is sent to a server, such as the server 12.

After the mobile device 16 requests the update information, the mobile device 16 can receive the update information from the server 12 at stage 56. The update information can identify an update package for an application installed on the mobile device 16, e.g., the respective application. In one example, the update information can identify multiple update packages, each corresponding to a different application installed on the mobile device. The update information can also identify the one or more required permission settings associated with the respective application.

At decision block 58, the mobile device 16 determines if one or more required permission settings associated with the update information are included in the one or more granted permission settings associated with the respective application to be updated on the mobile device 16.

If the one or more required permission settings associated with the update information are included in the one or more granted permission settings associated with the respective application, the mobile device 16 can send a request for transmission of the update package to the server 12 without user interaction at stage 60. The request for transmission of the update package can include information sufficient to cause the server 12 to retrieve and send the update package to the mobile device 16. The request for transmission can be an HTTP GET request for download of the application, for example, by specifying a URL that is included in the update package. The request for transmission can, for example, be sent without the device user initiating the request. After sending the request for transmission of the update package to the server, the mobile device 16 can receive the update package from the server 12.

Once the update package is received, the update package can be installed at stage 62. The installation of the update package can occur without any interaction or activity on the part of the user of the mobile device 16. The device user does not need to review the request, input commands to the mobile device 16 to install the update package, or otherwise interact with the device in order for the installation to occur. Once the update package is installed, the process 50 ends. The process 50 can repeat per a given schedule, or intermittently, as directed by application management settings associated with the mobile device 16.

However, if one or more required permission settings associated with the update information are not included in the one or more granted permission settings associated with the respective application, the mobile device 16 can send a notification regarding the availability of the update package at stage 64. The notification is configured to be reviewed by the user of the mobile device 16. For example, the notification can be in the form of an email, a text, an icon appearing in a status bar, or any other suitable method of informing the user of the mobile device 16 that a notification is available for review by the user of the mobile device 16. The notification regarding the update package can include information identifying the respective application and information regarding access to the one or more required permission settings associated with the respective application.

After the notification is sent to the user at stage 64, the mobile device 16 can receive a request to modify the one or more granted permission settings associated with the respective application identified in the notification regarding the update information to include the one or more required permission settings associated with the update package at stage 66. The mobile device 16 can, based on the request, modify the one or more granted permission settings associated with the respective application to include the one or more required permission settings associated with the update package or update information. Once the one or more granted permission settings include the one or more required permission settings, the process 50 can continue and the mobile device 16 can send the request for the update package at stage 60, and the update package can be received and installed at stage 62. As above, once the update package is installed, the process 50 ends.

Process 70 in FIG. 4 also includes a computing device such as mobile device 16 in communication with the system 10 as shown in FIG. 1.

In stage 72, application management information can be accessed at the mobile device using the update manager application 22. As in FIG. 3, the application management information can include information identifying the mobile device 16 and configuration information pertaining to the mobile device 16. The application management information can identify a plurality of applications installed on the mobile device and identify one or more granted permission settings associated with each installed application.

After accessing the application management information, the mobile device 16 can send a request for update information regarding each installed application to the server 12 at stage 74. As in FIG. 3, the request for update information can include the application management information identifying the mobile device 16, identifying the applications installed on the mobile device 16, and identifying the granted permission settings associated with each installed application.

After the mobile device 16 requests the update information, the mobile device 16 can receive the update information from the server 12 at stage 76. The update information can identify an update package for an application installed on the mobile device 16, e.g., the respective application.

After the mobile device 16 receives the update information from the server 12, the mobile device 16 can receive the update package from the server 12 at stage 78. The update package can include information identifying the one or more required permission settings associated with the respective application to be updated on the mobile device 16.

At decision block 80, the mobile device 16 determines if one or more required permission settings associated with the update package are included in the one or more granted permission settings associated with the respective application to be updated on the mobile device 16.

If the one or more required permission settings associated with the update package are included in the one or more granted permission settings associated with the respective application, the mobile device 16 can install the update package at stage 82. The installation of the update package can occur without any interaction or activity on the part of the user of the mobile device. Once the update package is installed, the process 70 ends. The process 70 can repeat per a given schedule, or intermittently, as directed by application management settings associated with the mobile device 16.

However, if one or more required permission settings associated with the update package are not included in the one or more granted permission settings associated with the respective application, the mobile device 16 can send a notification regarding the availability of the update package at stage 84. The notification is as described in FIG. 3.

After the notification is sent to the user at stage 84, the mobile device 16 can receive a request to modify the one or more granted permission settings associated with the respective application identified in the notification regarding the update package to include the one or more required permission settings associated with the update package at stage 86. The mobile device 16 can, based on the request, modify the one or more granted permission settings associated with the respective application to include the one or more required permission settings associated with the update package or update information. Once the one or more granted permission settings include the one or more required permission settings, the process 70 can continue and the update package can be installed at stage 82. As above, once the update package is installed, the process 70 ends.

The embodiments of the server 12 and the mobile device 16 (and the algorithms, methods, instructions etc. stored thereon and/or executed thereby) can be realized in hardware including, for example, intellectual property (IP) cores, application-specific integrated circuits (ASICs), programmable logic arrays, optical processors, programmable logic controllers, microcode, firmware, microcontrollers, servers, microprocessors, digital signal processors or any other suitable circuit. In the claims, the term "processor" should be understood as encompassing any the foregoing, either singly or in combination. The terms "signal" and "data" are used interchangeably. Further, portions of server 12 and mobile device 16 do not necessarily have to be implemented in the same manner.

In one embodiment, the server 12 and mobile device 16 can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Further, all or a portion of embodiments of the present invention can take the form of a computer program product accessible from, for example, a non-transitory computer-usable or computer-readable medium. A non-transitory computer-usable or computer-readable medium can be any device that can, for example, tangibly contain, store, communicate, or transport the program for use by or in connection with any processor. The non-transitory medium can be, for example, an electronic device, magnetic device, optical device, electromagnetic device, or a semiconductor device. Other suitable mediums are also available. As an example, the process 50 can take the form of a computer program product that is accessible to the mobile device 16 from the memory 20 of the server 12.

While this disclosure includes what is presently considered to be the most practical and preferred embodiments, it is to be understood that the disclosure is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for updating an application on a mobile device, comprising:
    accessing, at the mobile device, application management information, wherein the application management information identifies a plurality of applications installed on the mobile device and one or more granted permission settings associated with a first installed application;
    sending, from the mobile device to a server, a request for update information regarding the first installed application;
    receiving, at the mobile device from the server, the update information, wherein the update information identifies an update package for the first installed application;
    sending, by the mobile device, a notification regarding the update package if at least one of one or more required permission settings associated with the update package are not included in the one or more granted permission settings associated with the first installed application, wherein the notification is configured to be reviewed by a user of the mobile device;
    receiving, from the user of the mobile device, a request to modify the one or more granted permission settings associated with the first application to include the at least one of the one or more required permission settings associated with the update package;
    modifying the one or more granted permission settings associated with the first application to include the at least one of the one or more required permission settings associated with the update package; and
    installing the update package once the at least one of the one or more required permission settings associated with the update package is included in the one or more granted permission settings associated with the first application.

2. The method of claim 1, wherein the update information also identifies the one or more required permission settings.

3. The method of claim 2, further comprising:
    sending, from the mobile device to the server, a request for transmission of the update package without user interaction from a user of the mobile device before receiving, from the user of the mobile device, a request to modify the one or more granted permission settings associated with the first installed application identified in the notification regarding the update package to include the at least one of the one or more required permission settings associated with the update package; and receiving, at the mobile device from the server, the update package.

4. The method of claim 1, further comprising:
receiving, at the mobile device from the server, the update package, wherein the update package includes information identifying the one or more required permission settings.

5. The method of claim 1, wherein sending, from the mobile device to a server, a request for update information is performed without user interaction.

6. The method of claim 1, wherein the notification regarding the update package includes information identifying the first installed application and information regarding access to the one or more required permission settings associated with the respective application of the plurality of installed applications.

7. A mobile device, comprising:
a display;
an input device;
one or more processors for controlling the operations of the mobile device, and
a memory for storing data and program instructions used by the one or more processors, wherein the one or more processors are configured to execute instructions stored in the memory to:
access application management information, wherein the application management information identifies a plurality of applications installed on the mobile device and one or more granted permission settings associated with a first installed application;
send a request for update information regarding the first installed application;
receive the update information, wherein the update information identifies an update package for the first installed application;
send a notification regarding the update package if at least one of one or more required permission settings associated with the update package are not included in the one or more granted permission settings associated with the first installed application, wherein the notification is configured to be reviewed by a user of the mobile device;
receive a request to modify the one or more granted permission settings associated with the first application to include the at least one of the one or more required permission settings associated with the update package;
modify the one or more granted permission settings associated with the first application to include the at least one of the one or more required permission settings associated with the update package; and
install the update package once the at least one of the one or more required permission settings associated with the update package is included in the one or more granted permission settings associated with the first application.

8. The mobile device of claim 7, wherein the update information also identifies the one or more required permission settings.

9. The mobile device of claim 8, wherein the one or more processors are further configured to:
send a request for transmission of the update package to the server without user interaction from a user of the mobile device before receiving, from the user of the mobile device, a request to modify the one or more granted permission settings associated with the respective application identified in the notification regarding the update package to include the at least one of the one or more required permission settings associated with the update package; and
receive the update package from the server.

10. The mobile device of claim 7, wherein the one or more processors are further configured to:
receive the update package from the server, wherein the update package includes information identifying the one or more required permission settings.

11. The mobile device of claim 7, wherein sending the request to a server for update information is performed without user interaction.

12. The mobile device of claim 7, wherein the notification regarding the update package includes information identifying the respective application and information regarding access to the one or more required permission settings associated with the respective application of the plurality of installed applications.

13. A non-transitory computer readable medium including program instructions executable by one or more processors that, when executed, cause the one or more processors to perform operations, the operations comprising:
accessing, at a mobile device, application management information, wherein the application management information identifies a plurality of applications installed on the mobile device and one or more granted permission settings associated a first installed application;
sending, from the mobile device to a server, a request for update information regarding the first installed application;
receiving, at the mobile device from the server, the update information, wherein the update information identifies an update package for the first installed application;
determining whether the one or more granted permission settings associated with the first installed application include the one or more required permission settings associated with the update package; and
if at least one of the one or more required permission settings associated with the update package is not included in the one or more granted permission settings associated with the first installed application:
sending a notification regarding the update package wherein the notification is configured to be reviewed by a user of the mobile device,
receiving, from the user of the mobile device, a request to modify the one or more granted permission settings associated with the first installed application regarding the update package to include the one or more required permission settings associated with the update package,
modifying the one or more granted permission settings associated with the first installed application to include the one or more required permission settings associated with the update package,
sending, from the mobile device to the server, a request for transmission of the update package,
receiving, at the mobile device from the server, the update package, and
installing the update package once the one or more required permission settings associated with the update package are included in the one or more granted permission settings associated with the first installed application, or if each of the one or more required permission settings associated with the update package is included in the one or more granted permission settings associated with the first installed application:
sending, from the mobile device to the server, a request for transmission of the update package,
receiving, at the mobile device from the server, the update package, and
installing the update package without user interaction from the user of the mobile device.

* * * * *